March 17, 1925.

K. L. HANSEN 1,530,172

SYSTEM OF MOTOR CONTROL

Filed Jan. 14, 1922

Inventor:
K. L. Hansen,
By Erwin, Wheeler & Woolard
Attorneys.

Patented Mar. 17, 1925.

1,530,172

UNITED STATES PATENT OFFICE.

KLAUS L. HANSEN, OF MILWAUKEE, WISCONSIN.

SYSTEM OF MOTOR CONTROL.

Application filed January 14, 1922. Serial No. 529,144.

*To all whom it may concern:*

Be it known that I, KLAUS L. HANSEN, a citizen of the United States, and a resident of the city of Milwaukee, county of Milwaukee, State of Wisconsin, have invented certain new and useful Improvements in Systems of Motor Control; and I do declare the following to be a clear, exact, and complete description thereof, such as will enable persons skilled in the art to which the invention relates to make and use the same, reference being had to the accompanying drawing for an illustration of an arrangement in which my invention has been embodied.

The invention relates to a new system of control for electric motors.

The object of the invention is to provide simple and relatively inexpensive means for eliminating or greatly reducing the energy losses which are incidental to the operation of motors that have to start and accelerate loads of relatively high inertia at frequent intervals.

For an illustration of the use of such motors in which there are great losses of energy in their operation under the conditions stated, reference may be had as examples to electrically operated elevators and other hoists, centrifugal separators, railway trains and street cars, in the intermitting operation of which it is recognized that severe energy losses occur both in accelerating and retarding the motors employed as the actuating means therefor.

It is a common practice, in controlling the current and thus the rate of acceleration, when a direct current motor is started from substantially constant potential supply mains, to insert resistors in series with the motor, the resistors being gradually cut out as the motor comes up to speed. The function of these resistors is to reduce the supply voltage until the motor builds up a counter voltage equal to, or approximately equal to, the supply voltage. Obviously, the rate at which energy is lost is the product of the current flowing and the voltage drop in the resistors and motor windings.

In a paper entitled "Analysis of starting characteristics of direct-current motors" presented by me at the Fifth Midwinter Convention of the American Institute of Electrical Engineers, at New York, on February 16, 1917, I have shown that if the friction or lifting load is negligible as compared with the inertia load, the energy wasted is equal to the energy stored in the moving parts; that is, where energy consuming devices are used to reduce the voltage during acceleration, the efficiency is less than 50%. And further, that during the braking period the energy which is stored during acceleration is wasted in heating the brake shoes, or only partially restored to the line, with the result that in such applications as mentioned the overall efficiency of the motors in practice is often as low as 40%, or even lower.

It is quite natural that efforts should have been directed toward eliminating and retrieving this enormous waste of power. Such efforts, however, have been mostly directed to means for utilizing the stored energy when slowing down, resulting in numerous schemes of regenerative braking. One characteristic of most of these schemes is that they are effective only above a certain speed, and stored energy can, therefore, be but partly regained, in view of these limitations. Efficiency during acceleration is not improved by any of these methods.

An exception to the rule stated above exists in the Ward-Leonard system, which provides efficient acceleration and braking clear down to a standstill. But this system requires an additional motor generator set, the motor and generator each having a capacity greater than the driving motor. Efficiency, therefore, is gained at a great expense of machinery, the capacity of which is three times that actually required or necessary, to effect the results desired.

In accordance with my invention, and in order to provide a simple and easy means for controlling the acceleration and braking with a minimum waste of energy and the least possible expenditure of material, I employ an auxiliary motor in series with the main motor. The capacity of this auxiliary depends upon the circumstances attending its use, but in general such capacity will be one half or less than that of the main motor, and thus at most less than one fourth of the additional capacity required in the older systems.

The purpose of this auxiliary motor is to absorb surplus energy from the line during the first half of the acceleration, and supply the energy thus absorbed during the last half of the acceleration. When braking, the auxiliary motor first absorbs energy from the main motor, and then returns this energy to the line and so adjusts the voltages that the main motor acts as a generator until it stops.

Having in the foregoing outlined the general nature of my present invention, and the objections of prior systems which it is designed to overcome, I will now refer to its practical application in connection with the diagrams shown in the accompanying drawing, which will be progressively described.

Figure 1:
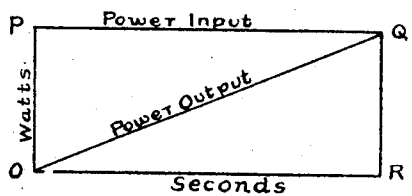
Figure 1 is a diagram illustrating the energy relations in accelerating a direct current motor.

Fig. 1 illustrates the energy relations in accelerating a direct current motor by means of a starting resistance, as are well known, it being assumed that the current is substantially constant, the friction load and internal losses are negligible, and that the flux remains practically constant. Under these conditions the torque is constant and the speed increases uniformly. The counter E. M. F. of the motor is directly proportional to the speed, and therefore increases uniformly. The same is true of the power developed by the motor, which is the product of the counter E. M. F. and the constant current.

The instantaneous value of the power developed by the motor, and thus delivered to the motor shaft, is represented by the line O Q, and the energy stored in the revolving parts (measured in watt-seconds) is represented by the area of the triangle O Q R. The power taken from the line at constant voltage and current is constant, and represented by the line P Q. The total energy taken from the line during the acceleration is then represented by the rectangle O P Q R. Since only one half of this energy, that represented by the triangle O R Q is used up in acceleration and thus stored, it is apparent that the other half, represented by the triangle O P Q, is wasted in $I^2 R$ losses in the external resistance. The efficiency of acceleration is therefore only 50%, and when it is remembered that the energy which has been stored is again usually wasted in heat in brake shoes or resistance, the extreme inefficiency and retardation combined can be readily comprehended.

Figure 2:
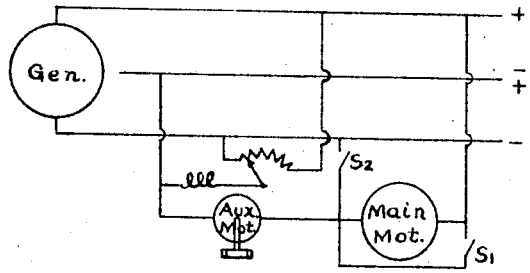
Fig. 2 is a diagram illustrating the arrangement of a main motor and an auxiliary motor in series in a double voltage system.

Fig. 2, illustrates diagrammatically the arrangement of a main motor and an auxiliary motor connected in series with it in a 3-wire double voltage system. To begin with, the switch $S_1$ is closed, short circuiting the main motor, and the auxiliary motor has been started by any desired means. The switch $S_1$ is now opened, inserting the main motor in the circuit. However, the current flowing, being only that required to overcome the no load losses of the auxiliary motor, is in general not sufficient to start the main motor. If the counter E. M. F. of the auxiliary motor is lowered by weakening its field, a larger current will flow through the armature of both motors, and if this current be sufficient to overcome the friction load, the main motor will start.

The current increase not only starts the main motor, but also increases the speed of the auxiliary motor, the speed increase of each motor depending in general upon the accelerating torque and the moment of inertia of the revolving parts. Ordinarily, the inertia of the auxiliary motor armature is not sufficient to obtain the desired results, and it will be supplied with a fly wheel to correct the deficiency. By continued weakening of the auxiliary motor field, approximately constant current is maintained, and the main motor accelerates uniformly.

The auxiliary motor speed increases, but at a decreasing rate, the torque falling off rapidly with the weakening of its field. When zero field current is reached it has attained maximum speed and its counter E. M. F. now being zero, the main motor is practically running between neutral and one main line. Up to this point the energy absorbed by the auxiliary motor has been stored in its revolving parts, including the fly wheel. The auxiliary motor field is now reversed and gradually increased in strength. Its counter E. M. F. is now in the same direction as the line voltage, thus boosting the same, and acting as a generator, it gives up the energy which was stored to the main motor as its speed decreased.

When full field strength in opposite direction has been reached, the speed of the auxiliary motor will not be back at its original value because the internal losses prevent perfect equalization of the energy stored and restored, but will be somewhat lower than normal. For the same reason the main motor is not quite up to speed, but is sufficiently near to it so that switch $S_2$ can be closed. The closing of switch $S_2$ also connects the auxiliary motor between the neutral and negative main line and this obviously, brings it back to normal speed.

The function of the auxiliary motor is essentially that of storing and restoring energy, and the speed variation is simply a convenient method of accomplishing this, but is not absolutely necessary. For instance, if the moment of inertia of the auxiliary motor rotating parts be increased in proper proportion simultaneously with a decrease in field current, energy can be stored with the speed of the auxiliary motor remaining substantially constant. However, for mechanical reasons I prefer to change the speed.

When it is desired to stop the main motor, switch $S_2$ is opened and the auxiliary motor goes through the same process of weakening and strengthening its field and finally back to the original condition, when the main motor stops. During the first half of the retardation period the auxiliary motor absorbs energy from the main motor and during the last half delivers the energy thus stored to the line.

It will be seen that with the arrangement described the main motor can be operated at its normal speed as long as desired. Also that any discrepancy in the energy relation, and therefore in the speed of the auxiliary motor, which the internal losses may bring about during acceleration or retardation, is compensated for and normal conditions restored whenever the main motor is switched onto the stand-still or running positions. Any cumulative discrepancy, which would eventually cause the auxiliary motor speed to drop too low or rise too high, is thereby prevented. The maintaining of correct energy relations and the ability to run the main motor at normal speed for any desired length of time are desirable characteristics of the arrangement, the importance of which in giving flexibility to the systems when operating on a very irregular cycle, hardly needs to be pointed out.

Figure 3:
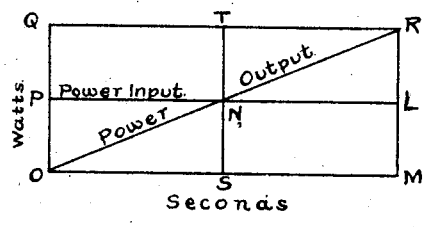
Fig. 3 is a diagram illustrating the energy relations in the motors indicated in Fig. 2.

Fig. 3 illustrates the energy relations of the arrangement described. The rectangle O P L M represents the total energy delivered by the line. During the first half of the acceleration, the energy input is equally divided between the auxiliary and the main motors, the triangle O P N representing the energy input to the former, and the triangle O N S the energy input to the latter. During the last half the triangle N R L, representing the energy input given up by the auxiliary motor, is added to the energy delivered by the line, represented by the rectangle S N L M, and the total delivered to the main motor will be represented by the trapezoid S N R M.

Figure 4:
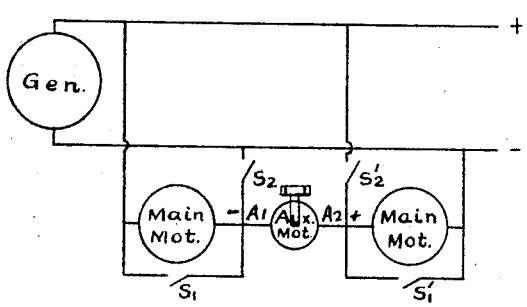
Fig. 4 is a diagram showing the arrangement of two main motors in a single voltage system.

Fig. 4 shows how the desired results may be secured by the use of two main motors, in a 2-wire single voltage system, for application where it is not convenient to use a 3-wire system. The manipulation of the auxiliary motor field and the switches in the 2-wire system is the same as previously described.

With switches $S_1$ and $S_1^1$ closed, the auxiliary motor is brought up to speed. The switches $S_1$ and $S_1^1$ are then opened, and all three machines are in series between the two main lines. The counter voltage of the auxiliary machine is approximately equal to the line voltage, and its polarity is positive at $A_1$ and negative at $A_2$. The auxiliary motor now passes through the cycle of weakening, reversing and again strengthening its field. After reversal of its field, the polarity is positive at $A_2$ and negative at $A_1$. By the time full field strength in opposite directions is reached, the voltage of all three machines is approximately equal to the line voltage, and closing of the switches $S_2^1$ and $S_2$ simultaneously, connects all of them in parallel across the line.

Figure 5:
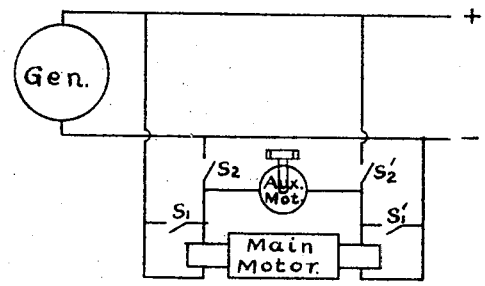
Fig. 5 shows diagrammatically a modified arrangement in which a single motor may be used instead of two as in Fig. 4.

Fig. 5 shows an arrangement designed to meet the condition when it is not convenient to use two separate motors, as in Fig. 4. Instead of two separate machines, two armature windings and two commutators are used in the same motor structure, the operation of the switches being as before.

In all of the forms in which my invention may be embodied, the main motor and the auxiliary motor are connected in series in an auxiliary circuit, with provisions for first short circuiting the main motor and then bringing the main motor into such circuit for series operation, after which all of the motors are switched into parallel on the main circuit, so that they have independent operation.

Having thus described my invention, what I claim and desire to secure by Letters Patent of the United States, is:

1. In a system of motor control, a main motor and an auxiliary motor, means for connecting the said motors in series during the acceleration and retardation of the main motor, in combination with means for simultaneously connecting both motors to the line at the end of the acceleration period in such manner that they run independently.

2. In a motor control comprising a 3-wire double-voltage direct current system, a main motor and an auxiliary motor, means for connecting the said motors in series between the neutral and one main line during the acceleration and retardation of the main motor, and means for switching the main motor onto both main lines, and the auxiliary motor onto one main line and neutral to alternately store and restore energy for accelerating and retarding the main motor.

3. In a system of motor control, a generator, a main motor and an auxiliary motor connected therewith, and means in the connections to short circuit the main motor and then to energize the main motor in the operation of the auxiliary motor, by suitably varying the terminal voltage of the latter, to alternately store and restore energy for accelerating and retarding the main motor.

4. The combination of a generator for supplying an auxiliary circuit with current of constant potential, a power motor within the circuit and the auxiliary motor in series therewith, means to short circuit the main motor and then to energize the main motor in the operation of the auxiliary motor by suitably varying the terminal voltage of the latter, to store and restore energy, and means for switching the main motor into the main circuit.

5. In a system of motor control, a generator, a main circuit and an auxiliary circuit, a main motor and an auxiliary motor connected in series in the auxiliary circuit, means to short circuit the main motor and then to energize the main motor in the operation of the auxiliary motor, by suitably varying the terminal voltage of the latter, and means to switch the main motor onto the main circuit.

6. In a motor control comprising a 3-wire double voltage direct current system, a main motor and an auxiliary motor in series in an auxiliary circuit, means for simultaneously connecting the main motor with both main lines, and the auxiliary motor with the neutral and one main line, to alternately store and restore energy for accelerating and retarding the main motor.

In testimony whereof, I have signed my name at Milwaukee, this 11th day of January, 1922.

K. L. HANSEN.

Witnesses:
V. C. WEBER,
W. F. WOOLARD.